United States Patent [19]

Ohe et al.

[11] Patent Number: 4,666,011

[45] Date of Patent: May 19, 1987

[54] ELECTRICAL POWER STEERING APPARATUS

[75] Inventors: Takeshi Ohe; Ichiro Koike, both of Higashimatsuyama; Hideo Konishi, Ohsato, all of Japan

[73] Assignee: Jishoda Kiki Co., Ltd., Tokyo, Japan

[21] Appl. No.: 764,630

[22] Filed: Aug. 12, 1985

[30] Foreign Application Priority Data

Aug. 17, 1984 [JP] Japan .................. 59-170482

[51] Int. Cl.⁴ .................................. B62D 5/04
[52] U.S. Cl. .................................. 180/79.1; 180/142; 318/282; 364/424
[58] Field of Search ............... 180/79.1, 79, 131, 142, 180/141; 74/388 PS; 318/282; 364/424

[56] References Cited

U.S. PATENT DOCUMENTS

| | | | |
|---|---|---|---|
| 4,476,529 | 10/1984 | Nakamura | 364/424 |
| 4,509,611 | 4/1985 | Kade | 180/79.1 |
| 4,522,278 | 6/1985 | Kotugara | 180/142 |
| 4,538,698 | 9/1985 | Hashimoto | 180/79.1 |

FOREIGN PATENT DOCUMENTS

| | | | |
|---|---|---|---|
| 2507142 | 12/1982 | France | 180/79.1 |
| 0076760 | 6/1980 | Japan | 180/79.1 |
| 0008467 | 1/1983 | Japan | 180/79.1 |
| 59-63264 | 4/1984 | Japan | 180/79.1 |

*Primary Examiner*—John J. Love
*Assistant Examiner*—Charles R. Watts
*Attorney, Agent, or Firm*—Claude A. S. Hamrick

[57] ABSTRACT

An electrical power steering apparatus includes a vehicle velocity sensor for detecting a vehicle velocity, a steering torque sensor for detecting a steering torque of a steering wheel, comparators for receiving the voltage signal from the steering torque sensor and detecting a steering direction, a motor drive mechanism, a vehicle wheel declination sensor for detecting a declination of a vehicle wheel, a nonsteering state detecting unit including an absolute value converter, a reference voltage generator and a comparator to detect a nonsteering state, and a controller for supplying a current of a magnitude corresponding to the declination of the vehicle wheel to the motor so as to decrease the declination during the nonsteering state.

11 Claims, 25 Drawing Figures

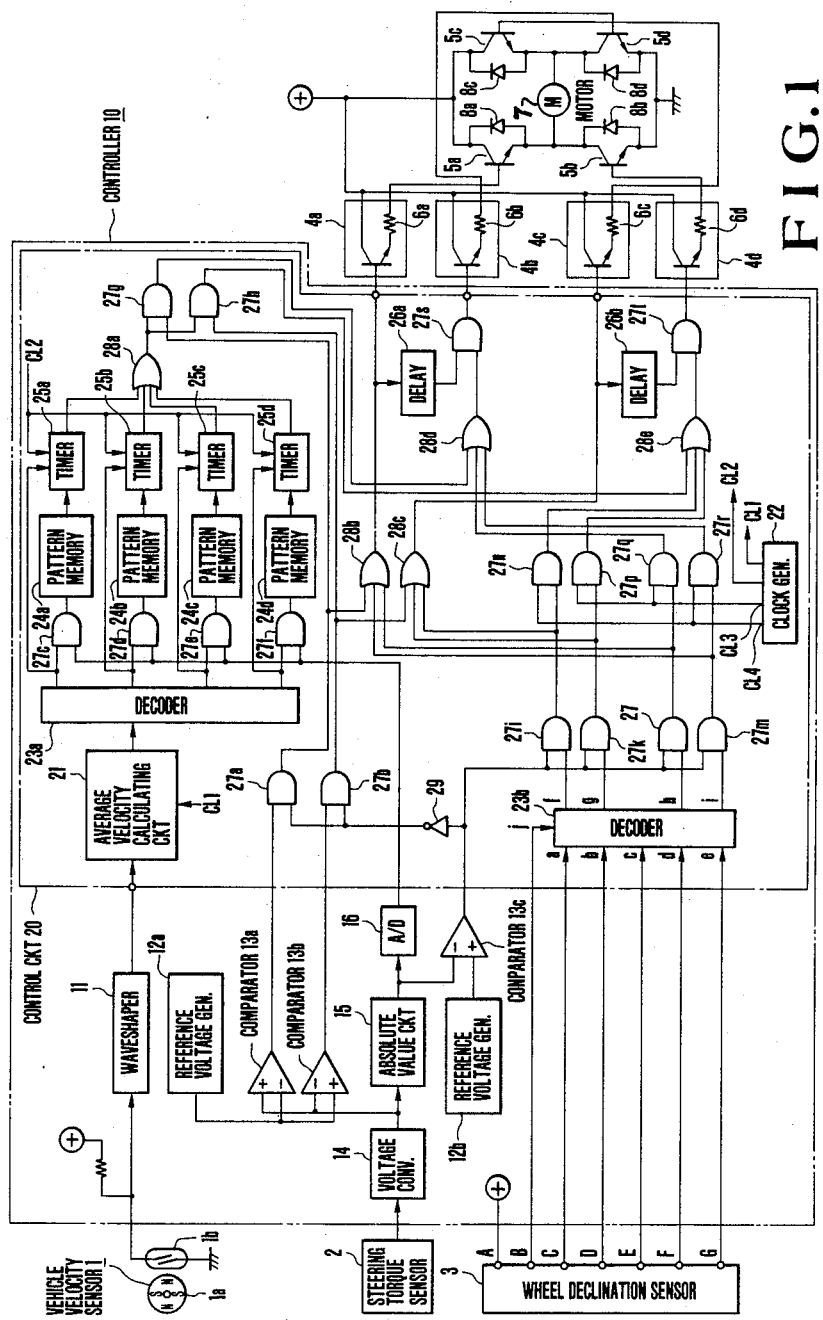

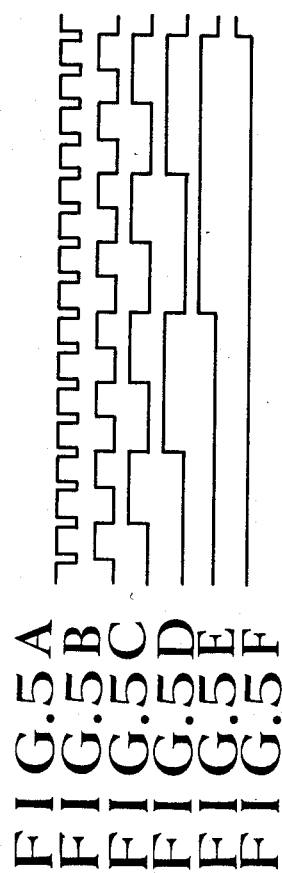
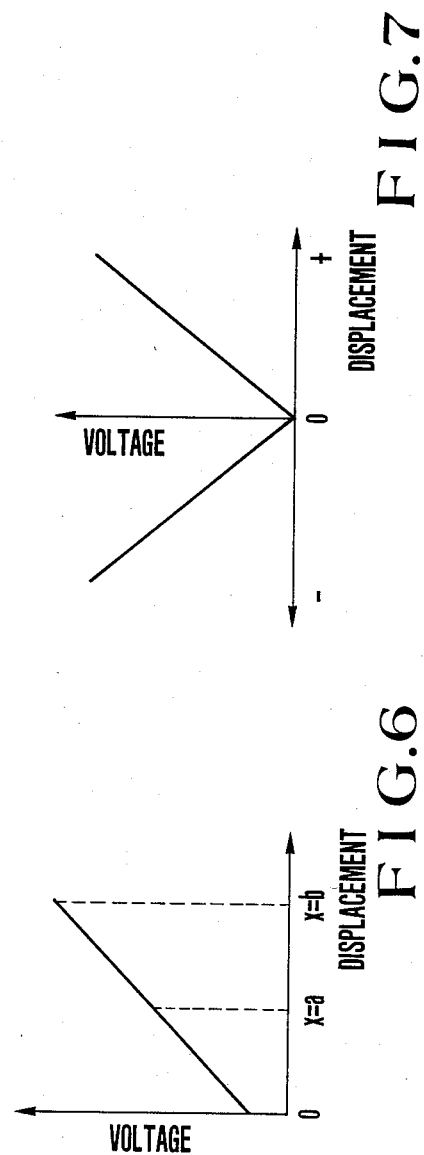
FIG.5A
FIG.5B
FIG.5C
FIG.5D
FIG.5E
FIG.5F
FIG.6
FIG.7

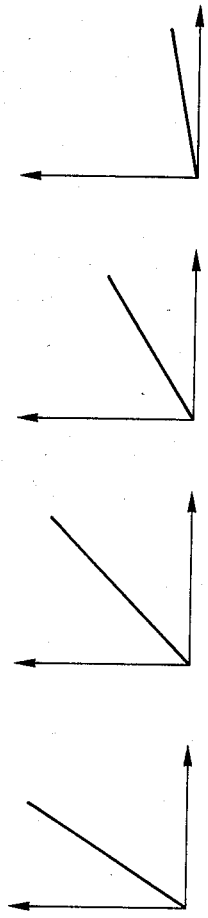
FIG.8A  FIG.8B  FIG.8C  FIG.8D
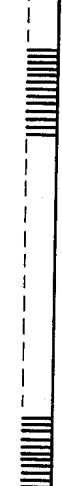
FIG.9A (CL1)
FIG.9B (CL2)
FIG.9C (CL3)
FIG.9D (CL4)

4,666,011

ELECTRICAL POWER STEERING APPARATUS

BACKGROUND OF THE INVENTION

The present invention relates to a power steering apparatus for performing power steering through a motor.

A hydraulic power steering apparatus has been conventionally used to steer wheels with a small steering force. In this case, oil leakage must be strictly prevented, and such a power steering apparatus cannot be made compact. In addition, a hydraulic pump and pipes must be used, resulting in high cost. In order to eliminate these drawbacks, a rotational force of a motor can be directly utilized as an auxiliary force.

In a conventional electronic power steering apparatus, a rotor of the motor must be rotated in the reverse direction by the number of times required for turning when straight driving is resumed after turning. A motor speed during reverse rotation is obtained by a self-aligning torque generated by wheel drag. In this case, a frictional force occurs between a brush or the like in the motor and acts against rotation of the rotor. The rotor cannot thus be sufficiently rotated only by the self-aligning torque. This phenomenon typically occurs when a magnetic motor is used. The insufficiency must be compensated by providing an additional torque to the steering wheel. As a result, the driver experiences abnormal steering.

SUMMARY OF THE INVENTION

It is, therefore, a principal object of the present invention to provide an electrical power steering apparatus wherein a driver does not experience abnormal steering.

In order to achieve the above object of the present invention, there is provided an electrical power steering apparatus comprising: vehicle velocity detecting means for detecting a vehicle velocity; steering torque detecting means for detecting a steering torque of a steering wheel; steering direction detecting means for detecting a steering direction of the steering wheel; motor driving means for driving a motor to assist steering operation; means for detecting a declination of a vehicle wheel; means for detecting a nonsteering state; and control means for controlling the motor driving means in accordance with the vehicle velocity and the steering torque to control the torque of the motor and for supplying a current of a magnitude corresponding to the declination of the vehicle wheel to the motor so as to decrease the declination of the vehicle wheel while the nonsteering state is detected.

BRIEF DESCRIPTION OF THE DRAWINGS

FIG. 1 is a block diagram of an electrical power steering apparatus according to an embodiment of the present invention;

FIGS. 5A to 5F are respectively timing charts of output signals from the wheel declination sensor of FIG. 4;

FIG. 6 is a graph showing the input/output characteristics of a voltage converter;

FIG. 7 is a graph showing the input/output characteristics of an absolute value converter;

FIGS. 8A to 8D are graphs showing the input/output characteristics of pattern memories, respectively;

FIGS. 9A to 9D are respectively timing charts of output signals from a clock signal generator;

DESCRIPTION OF THE PREFERRED EMBODIMENT

Figure 3:
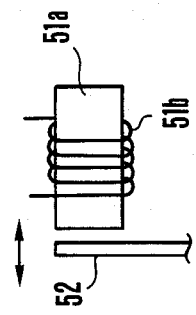
FIG. 3 is a schematic diagram showing the principle of operation of a gap sensor.

The present invention will be described in detail with reference to a preferred embodiment in conjunction with the accompanying drawings.

FIG. 1 is a block diagram of an electrical power steering apparatus according to an embodiment of the present invention. Reference numeral 1 denotes a vehicle velocity sensor which comprises a magnetic disk 1a rotated together with an axle, and a lead switch 1b; 2, a steering force sensor for detecting a steering torque; 3, a wheel declination sensor serving as a means for detecting a declination angle of a wheel that is, the angle of the wheel's rolling direction when the vehicle is turning, relative to its rolling direction when the vehicle is moving in a straight line; 4a to 4d and 5a to 5d, transistors, respectively; 6a to 6d, resistors, respectively; 7, a motor; 8a to 8d, diodes, respectively; and 10, a controller for controlling a current flowing through the motor in accordance with the vehicle velocity, the steering force, and the declination angle.

The controller 10 comprises a waveshaper 11, reference voltage generators 12a and 12b, comparators 13a to 13c, a voltage converter 14, an absolute value converter 15, an A/D converter 16 and a control circuit 20. The control circuit 20 comprises an average velocity calculating circuit 21, a clock signal generator 22, decoders 23a and 23b, pattern memories 24a to 24d, timers 25a to 25d, delay circuits 26a and 26b, AND gates 27a to 27t, OR gates 28a to 28e and an inverter 29.

Figure 2:
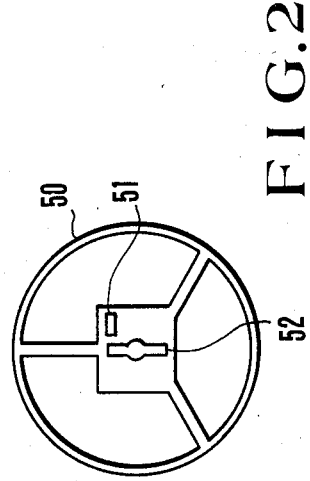
FIG. 2 is a schematic diagram showing a mounting state of a steering force sensor.

The steering force sensor 2 comprises a gap sensor 51 rotated together with a steering wheel 50 and an iron piece 52 of a magnetic material which is rotated together with the column shaft, as shown in FIG. 2. The gap sensor 51 comprises an iron core 51a and a coil 51b wound around the iron core 51a, as shown in FIG. 3. When the steering wheel 50 is turned, the iron core 51a comes close to or is separated from the iron piece 52 mounted on the column shaft and the reluctance is changed, thereby detecting a gap between the iron piece 52 and the iron core 51a, as shown in FIG. 3.

Figure 4:
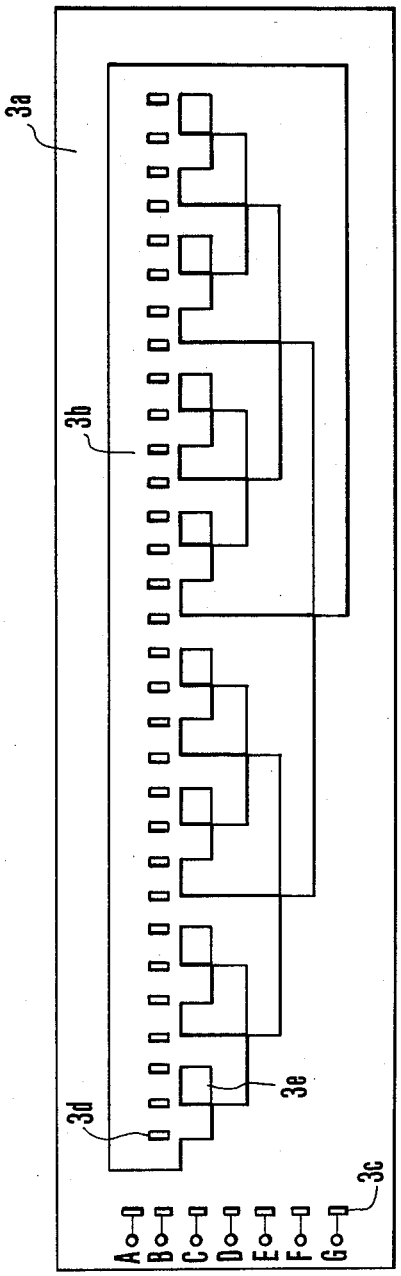
FIG. 4 is plan view of a wheel declination sensor.

As shown in FIG. 4, the wheel declination sensor 3 comprises an electrode 3b printed on a board 3a and seven sliders 3c moved along the electrode 3b. The seven sliders 3c are slid together on the electrode 3b along the right-and-left direction. The electrode 3b has slits 3d which are aligned along the sliding path of the slider connected to a terminal B, and blanks 3e formed at portions contacting the sliders connected to terminals C to G. The board 3a is fixed on the vehicle body, and the sliders 3c are moved together with a tie rod for controlling the declination direction. The conduction states of the terminals A and B to G change as shown in FIGS. 5A to 5F in accordance with movement of the tie rod.

Thus, the tie rod position, i.e., a declination angle of the wheel can be detected by the output signals from these terminals.

The voltage converter 14 converts a change in reluctance force of the gap sensor 51 in the steering force sensor 2 to a change in voltage, as shown in FIG. 6. Point x=a along the abscissa represents a straight driving position. Point x=0 represents a position at which the steering wheel is turned to the left with a maximum torque. Point x=b represents a position at which the steering wheel is turned to the right with a maximum torque. The absolute value converter 15 generates a V-shaped signal whose zero voltage level represents the straight driving position of the steering wheel, as shown in FIG. 7. A positive displacement represents a right steering torque, and a negative displacement represents a left steering torque. The comparator 13c generates a signal of logic "1" representing a nonsteering state when a magnitude of a signal supplied from the absolute value converter 15 is smaller than that of the signal supplied from the reference voltage generator 12b. The above arrangement constitutes a method for detecting a nonsteering state.

Pattern memories 24a to 24d comprise memories for storing duty ratios of currents selectively supplied to the motor 7 in correspondence with steering torques, respectively. As shown in FIGS. 8A to 8D, the pattern memories 24a to 24d store four different characteristics. Referring to FIG. 8, the steering torque is plotted along the abscissa, and the duty ratio of the current flowing through the motor 7 is plotted along the ordinate. More particularly, FIG. 8A shows characteristics at a low speed, wherein the duty ratio is increased and the torque from the motor 7 is increased. As the vehicle speed is increased, the duty ratio is gradually decreased as shown in FIGS. 8B to 8D, thereby decreasing the torque generated from the motor 7.

A clock signal CL2 is supplied to some of the timers 25a to 25d which are selected by the decoder 23a. The selected timers generate a signal of logic "1" for a predetermined period of time. When the predetermined period of time which is determined by a signal read out from a corresponding one of the pattern memories 24a to 24d has elapsed, the corresponding timer is reset, and its output level is reset to level "0". The decoder 23b decodes signals supplied to terminals a to e thereof. A decoded result is supplied from one of terminals f to i. When the terminal j is set at level "0", the currently generated decoded result is stored and generated irrespective of the signal supplied to the terminals a to e. However, when the terminal j goes to level "1", the signal supplied to the terminals a to e is decoded. The clock signal generator 22 generates the clock signal shown in FIG. 9.

In the electrical power steering apparatus having the arrangement described above, clockwise (right) turning will be described. When a driver turns the steering wheel clockwise, a vehicle velocity signal is generated from the vehicle velocity sensor 1 and is shaped by the waveshaper 11. A waveshaped signal is converted by the average velocity calculating circuit 21 to an average velocity signal. The average velocity signal is decoded by the decoder 23a. It should be noted that the decoder 23a selectively generates four output signals which represent four velocities from a high speed to a low speed. A signal of logic "1" appears at one of the terminals of the decoder 23a which corresponds to one of the four velocities.

In this case, since the driver turns the steering wheel, a steering torque detected by the steering sensor 2 is converted by the voltage converter 14 to a voltage. This voltage signal is supplied to the A/D converter 16 through the absolute value converter 15. A digital signal from the A/D converter 16 is supplied to the AND gates 27c to 27f. In practice, the signal of logic "1" is supplied from the decoder 23a to one of the AND gates 27c to 27f. The signal generated from the A/D converter 16 is supplied to one of the pattern memories 24a to 24d through the AND gate selected by the decoder 23a. In this case, when the vehicle velocity represents a minimum velocity region, the pattern memory 24a storing the characteristics of FIG. 8A is selected. However, when the velocity represents a maximum velocity region, the pattern memory 24d storing the characteristics of FIG. 8D is selected.

When one of the pattern memories 24a to 24d is selected, the steering torque signal is read out from the selected pattern memory. The readout signal is supplied to the corresponding timer. Therefore, when the timer selected by the decoder 23a receives the clock signal CL2, it generates an output. The timer is then stopped when the period of time which is determined by the signal generated from the pattern memory has elapsed. This operation is repeated, so that the selected timer generates a signal corresponding to a vehicle velocity and a steering torque.

The output from the voltage converter 14 is supplied to the comparators 13a and 13b and is compared with the signal generated from the reference voltage generator 12a. If the output level of the reference voltage generator 12a corresponds to the displacement of x=a of FIG. 6, a signal of level "1" is generated from the comparator 13a when the steering wheel is turned clockwise. In this case, the comparator 13c generates the signal of logic "0" which is then inverted by the inverter 29 to a signal of level "1". This signal of logic "1" is supplied to the AND gates 27a and 27b. In this manner, when the steering wheel is turned clockwise, the AND gate 27a generates a signal of level "1". The signal of level "1" is generated through the OR gate 28b to turn on the transistors 4a and 5a and is delayed by the delay circuit 26a for a predetermined period of time. The delayed signal is supplied to the AND gate 27s. The output from the AND gate 27a is supplied to the AND gate 27g, so that the signal generated from the OR gate 28a is supplied to the AND gate 27s through the AND gate 27g and the OR gate 28d. For this reason, the transistors 4b and 5d are turned on, and a current flows through the motor 7 from the left to the right in FIG. 1. The declination operation is performed by a torque generated by the motor 7. The duty ratio determined by the signal read out from one of the pattern memories 24a to 24d is proportional to the steering torque. A current flowing in the motor 7 has a larger average value when the steering torque is increased, thereby increasing the torque of the motor 7.

When the driver completely turns the steering wheel to the right, and a torque acting on the steering wheel is removed, the comparator 13c generates a signal of level "1". This signal is inverted by the inverter 29, and an inverted signal is supplied to the AND gate 27a. The output signal from the AND gate 27a goes from level "1" to level "0". The signal of level "1" generated from the OR gate 28b and the AND gate 27s also goes from level "1" to level "0". As a result, no current flows through the motor 7.

In this state, the vehicle travels straight, and the steering wheel is returned to the neutral position accordingly. The steering wheel returns to the position at which the steering torque does not act on the steering wheel. However, when wheel declination is performed by utilizing the rotational force of the motor, the steering wheel cannot be completely returned to the neutral position. This problem is solved in the following manner.

The wheel declination sensor 3 generates a signal corresponding to the wheel declination from the terminals B to G while the vehicle is being turned. The signal from the wheel declination sensor 3 is decoded by the decoder 23b. The signal of level "1" is generated from the terminal f or g during right turning. However, during left turning, the signal of level "1" is generated from the terminal h or i. The wheel declination range is divided into a large wheel declination region and a small wheel declination region. An output signal appears at the terminal f or i for the large wheel declination region. However, an output signal appears at the terminal g or h for the small wheel declination region.

When steering is performed during normal traveling, the wheel declination signal represents the small declination region. When a right steering state is changed to a nonsteering state and the wheel declination angle signal represents the small declination region, a signal of logic "1" appears at the terminal g of the decoder 23b. Since the nonsteering state is set, the comparator 13c generates a signal of logic "1". The signal generated from the decoder 23b is generated through the AND gate 27k. This signal is generated through the OR gate 28c to turn on the transistors 4c and 5c and is delayed by the delay circuit 26b by a predetermined period of time. A delayed signal is supplied to the AND gate 27t. The signal generated from the AND gate 27k is also supplied to the AND gate 27p, so that a clock signal CL3 is supplied to the AND gate 27t through the AND gate 27p and the OR gate 28e. Since the AND gate 27t receives a signal from the delayed circuit 26b, the AND gate 27t gates the signal from the OR gate 28e to the transistor 6d, so that the transistors 6d and 5b are turned on. For this reason, a current flows through the motor 7 from the right to the left in a manner opposite to right steering. Therefore, the motor 7 is rotated in a direction opposite to that during right steering.

In this case, a magnitude of the torque generated from the motor 7 need cancel only a force acting against the self-aligning torque and can be sufficiently smaller than that required for turning. An average value of the current supplied to the motor 7 can be small, and the duty ratio of the clock signal CL3 during reverse rotation of the motor 7 can be sufficiently smaller than that required during turning.

When a reverse current flows through the motor, the force acting against the self-aligning torque caused by use of a motor can be cancelled, and the turning state can be smoothly changed to the straight driving state. As a result, the driver will not experience abnormal steering.

As shown in FIG. 4, the wheel declination sensor 3 is arranged such that a contact state between one of the terminals C to G and the terminal A is changed in accordance with the binary notation. FIGS. 5A to 5F show output signals which are generated from the terminals B to G, respectively, and which are weighted with $2^0$ to $2^6$, respectively. When the sliders 3c are located at the boundaries between the conductive and nonconductive portions, indefinite outputs are obtained. When the vehicle vibrates, the output signal outputs vary, and the resultant outputs become unstable. When the slider connected to the terminal B reaches the slit 3d and no output appears at the output terminal B, the decoder 23b holds the immediately preceding state. When a signal is generated from the slider connected to the terminal B, this signal is decoded. For this reason, a stable output can be generated from the decoder.

The self-aligning torque acts to restore the straight driving state and the decoder 23b does not generate signals from any one of the terminals f to i thereof. The AND gates 27i to 27m, 27n to 27r, the OR gates 28d and 28e, and the AND gates 27s and 27t are set at level "0". Therefore, the current supply to the motor 7 is stopped.

The above operation is performed when the driver turns the steering wheel to the right. However, even when the driver turns it to the left, the operation can be performed in the same manner as described above. In this case, the direction of current flowing through the motor 7 is reversed.

When the wheel declination signal represents the large declination region, i.e., when the wheel declination is large, a vehicle velocity is generally low. For this reason, the self-aligning torque is also small, so that an insufficiency of the self-aligning torque must be compensated. When the detector 23b detects that the wheel declination signal represents the large declination, a signal of level "1" is generated from the AND gate 27i or 27m in accordance with the signal generated from the terminal f or i. The AND gate 27n or 27r generates a clock signal CL4. A duty ratio of the clock signal CL4 is larger than that of the clock signal CL3, so that an output generated from the motor 7 is set to be large.

Figure 10:
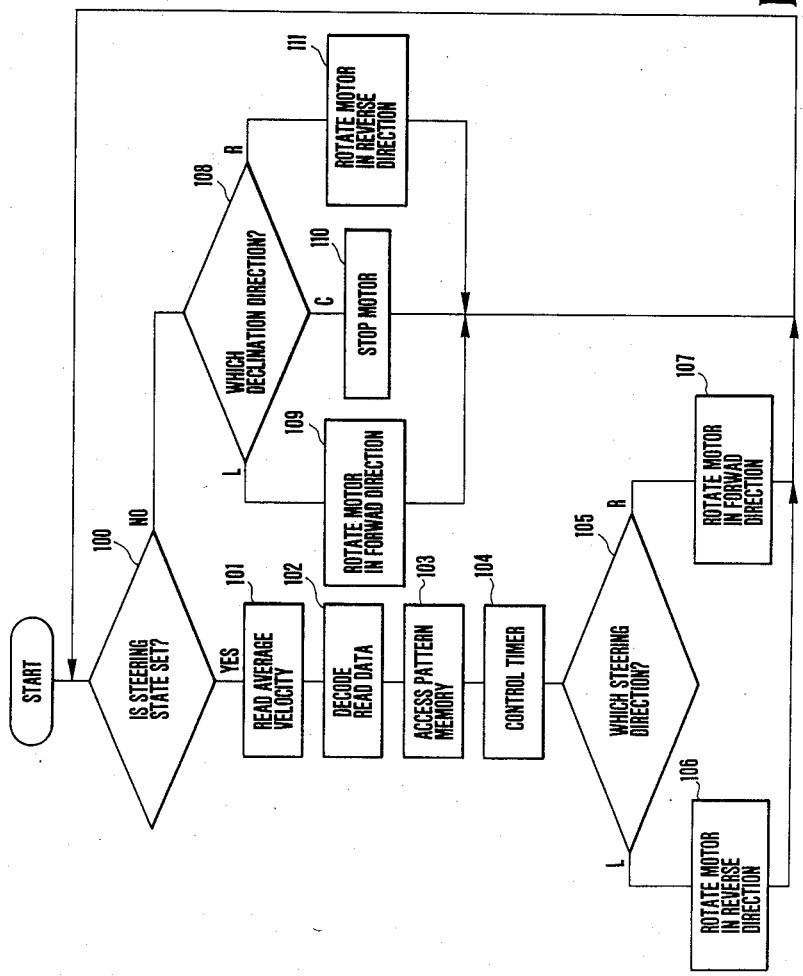
FIG. 10 is a flow chart for explaining the operation when the apparatus of FIG. 1 is constituted by a microprocessor.

FIG. 10 is a flow chart for explaining an operation of a microprocessor serving as the apparatus of FIG. 1. The correspondence between the main parts of the apparatus of FIG. 1 and the respective steps of the microprocessor will now be explained. Referring to FIG. 10, reference symbol R denotes right; L, left; and C, center.

| Step | Corresponding Parts of FIG. 1 |
| --- | --- |
| 100 | Comparator 13c |
| 101 | Average velocity calculating circuit 21 |
| 102 | Decoder 23a |
| 103 | Pattern memories 24a to 24d |
| 104 | Timers 25a to 25d |
| 105 | Comparators 13a and 13b |
| 106, 107 | AND gates 27g and 27h |
| 108 | Decoder 23b |
| 109, 110, 111 | AND gates 27i to 27m |

Figures 11, 12:
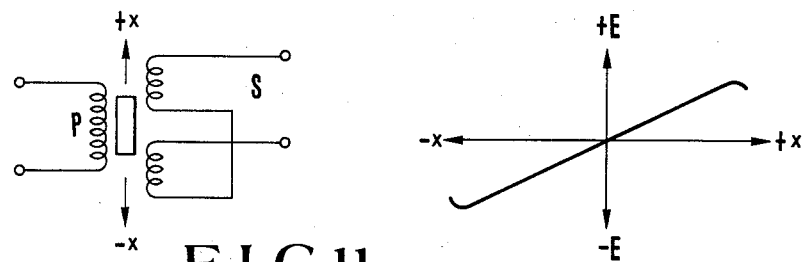
FIG. 11 is a circuit diagram of a differential voltage transformer.
FIG. 12 is a graph showing characteristics when the differential voltage transformer is used as the wheel declination sensor.
Figure 13:
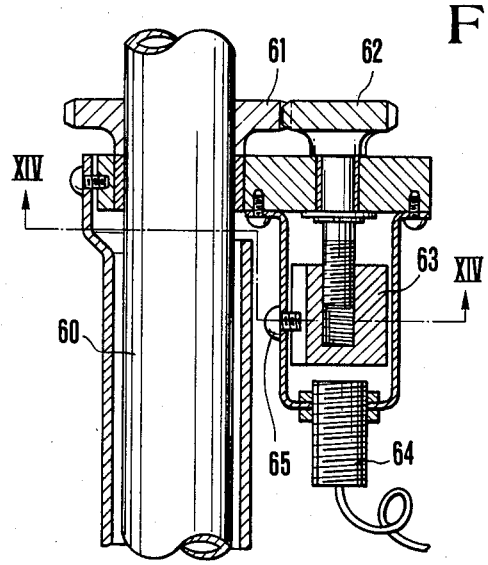
FIG. 13 is a sectional view showing a mounting state wherein the gap sensor as the wheel declination sensor is mounted on a column shaft.
Figure 14:
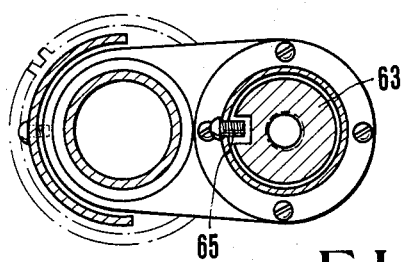
FIG. 14 is a sectional view of the gap sensor when taken along the line XIV—XIV.

The wheel declination sensor 3 comprises a contact type sensor shown in FIG. 4. However, a noncontact type sensor using a differential voltage transformer shown in FIG. 11 may be used in place of the contact type sensor. The differential voltage transformer comprises a coil mounted on a vehicle body and a movable core mounted on a tie rod. The characteristics shown in FIG. 12 can be derived from a movable core displacement. FIG. 13 shows another noncontact type sensor. A rotational force of a column shaft 60 is converted to a vertical linear driving force of a magnetic member 63 through gears 61 and 62. A positional change of the magnetic member 63 is detected by a gap sensor 64. FIG. 14 is a sectional view of the noncontact type sensor of FIG. 13 taken along the line XIV—XIV thereof. Referring to FIG. 14, the magnetic member 63 is guided by a boss 65.

According to the present invention, when the wheel is returned to resume straight driving after making a turn, a current which cancels a resistance of the motor flows in the motor in a direction opposite to that of a current required for turning. Therefore, the driver will not experience abnormal steering.

What is claimed is:

1. An electrical power steering apparatus comprising:
   vehicle velocity detecting means for detecting vehicle velocity and for generating a corresponding velocity signal;
   steering torque detecting means for detecting the steering torque of a steering wheel and for generating a corresponding steering torque signal;
   steering direction detecting means for detecting the steering direction of said steering wheel and for generating a corresponding steering direction signal;
   motor driving means for driving a power assist motor used to assist in the vehicle steering operation;
   means for detecting the declination angle of a vehicle means and for generating a corresponding wheel declination signal;
   means for detecting a nonsteering state and for generating a corresponding nonsteering state signal; and
   control means responsive to said velocity signal, said steering torque signal, said steering direction signal, said wheel declination signal, and said nonsteering state signal, and operative to control said motor driving means in accordance with said vehicle velocity signal and said steering torque signal so as to control the torque of said motor, and for supplying a current of a magnitude corresponding to said declination signal to said motor so as to decrease the declination angle of said vehicle wheel while said nonsteering state signal is detected.

2. An apparatus according to claim 1, wherein said velocity discriminating means comprises a decoder for receiving the velocity signal and generating the velocity mode signal and AND gates one of which receives the velocity mode signal and the steering detection signal from said steering torque detecting means and generates a corresponding velocity discrimination signal.

3. An apparatus according to claim 11, wherein said steering direction discriminating means comprises an inverter for receiving the nonsteering state signal and generating an inverted signal, and AND gates for commonly receiving the inverted signal and steering direction signals from said steering direction detecting means and for generating a steering direction discrimination signal.

4. An apparatus according to claim 11, wherein said current duty ratio memory means comprises: a plurality of pattern memories for respectively storing different current duty ratio signals and generating a corresponding current duty ratio signal in response to the velocity discrimination signal from a corresponding one of said AND gates; a plurality of timers which are connected to said pattern memories, respectively and each of which determines a time interval of the corresponding current duty ratio signal, and an OR gate for receiving a time interval signal from one of said timers and outputting a current duty signal.

5. An apparatus according to claim 11, wherein said declination discriminating means comprises a decoder for generating the declination discrimination signal.

6. An apparatus according to claim 11, wherein said motor forward/reverse rotation discriminating means includes:
   first AND gates each of which receives the declination discrimination signal from said declination discriminating means and one of which generates a declination mode signal;
   a first OR gate for receiving the steering direction discrimination signal and the declination discrimination signal and generating a first OR signal to drive switching means of said motor drive means;
   a delay circuit for receiving the first OR signal from said first OR gate and generating delayed signals;
   second AND gates which commonly receive the current duty signal and each of which receives the steering direction signal so as to generate a first AND signal;
   a second OR gate for receiving the first AND signal and the declination discrimination signal and generating a second OR signal; and
   a third AND gate for receiving the delayed signal from said delay circuit and the first or second OR signal;
   whereby said motor is supplied with the current of the magnitude corresponding the declination of the wheel during the nonsteering state.

7. An electrical power steering apparatus comprising:
   vehicle velocity detecting means for detecting vehicle velocity and for generating a corresponding velocity signal;
   steering torque detecting means for detecting the steering torque of a steering wheel and for generating a corresponding steering torque signal;
   steering direction detecting means for detecting the steering direction of said steering wheel and for generating a corresponding steering direction signal;
   motor driving means for driving a power assist motor used to assist in the vehicle steering operation;
   means for detecting the declination angle of a vehicle wheel and for generating a corresponding wheel declination signal, and including
   a patterned electrode on a board and
   a movable element slideable along said electrode, said electrode being provided with a plurality of slits and a plurality of blank portions so as generate a binary signal representing said declination angle;
   means for detecting a nonsteering state and for generating a corresponding nonsteering state signal; and
   control means responsive to said velocity signal, said steering torque signal, said steering direction signal, said wheel declination signal, and said nonsteering state signal, and operative to control said motor driving means in accordance with said vehicle velocity signal and said steering torque signal so as to control the torque of said motor, and for supplying a current of a magnitude corresponding to said declination signal to said motor so as to decrease the declination angle of said vehicle wheel while said nonsteering state signal is detected.

8. An electrical power steering apparatus comprising:
vehicle velocity detecting means for detecting vehicle velocity and for generating a corresponding velocity signal;
steering torque detecting means for detecting the steering torque of a steering wheel and for generating a corresponding steering torque signal;
steering direction detecting means for detecting the steering direction of said steering wheel and for generating a corresponding steering direction signal;
motor driving means for driving a power assist motor used to assist in the vehicle steering operation;
means for detecting the declination angle of a vehicle wheel and for generating a corresponding wheel declination signal, and including
a differential transformer mounted on a vehicle body and
a movable core mounted on a tie rod of the vehicle, said movable core being displaced relative to differential transformer by motion of the tie rod to detect the declination angle;
means for detecting a nonsteering state and for generating a corresponding nonsteering state signal; and
control means responsive to said velocity signal, said steering torque signal, said steering direction signal, said wheel declination signal, and said nonsteering state signal, and operative to control said motor driving means in accordance with said vehicle velocity signal and said steering torque signal so as to control the torque of said motor, and for supplying a current of a magnitude corresponding to said declination signal to said motor so as to decrease the declination angle of said vehicle wheel while said nonsteering state signal is detected.

9. An electrical power steering apparatus comprising:
vehicle velocity detecting means for detecting vehicle velocity and for generating a corresponding velocity signal;
steering torque detecting means for detecting the steering torque of a steering wheel and for generating a corresponding steering torque signal;
steering direction detecting means for detecting the steering direction of said steering wheel and for generating a corresponding steering direction signal;
motor driving means for driving a power assist motor used to assist in the vehicle steering operation;
means for detecting the declination angle of a vehicle wheel and for generating a corresponding wheel declination signal, and including
a magnetic member which is guided by a boss and linearly moved by means of gears upon rotation of a steering column shaft, and
a gap sensor for detecting a positional change in said magnetic member;
means for detecting a nonsteering state and for generating a corresponding nonsteering state signal; and
control means responsive to said velocity signal, said steering torque signal, said steering direction signal, said wheel declination signal, and said nonsteering state signal, and operative to control said motor driving means in accordance with said vehicle velocity signal and said steering torque signal so as to control the torque of said motor, and for supplying a current of a magnitude corresponding to said declination signal to said motor so as to decrease the declination angle of said vehicle wheel while said nonsteering state signal is detected.

10. An electrical power steering apparatus comprising:
vehicle velocity detecting means for detecting vehicle velocity and for generating a corresponding velocity signal;
steering torque detecting means for detecting the steering torque of a steering wheel and for generating a corresponding steering torque signal;
steering direction detecting means for detecting the steering direction of said steering wheel and for generating a corresponding steering direction signal;
motor driving means for driving a power assist motor used to assist in the vehicle steering operation;
means for detecting the declination angle of a vehicle wheel and for generating a corresponding wheel declination signal;
means for detecting a nonsteering state and including
an absolute value converter connected to said steering torque detecting means for receiving said steering torque signal and for generating a corresponding absolute value signal, and
a comparator for receiving said absolute value signal and a reference value, signal and for generating said nonsteering state signal when the magnitude of said absolute value signal is smaller than the value of said reference value signal; and
control means responsive to said velocity signal, said steering torque signal, said steering direction signal, said wheel declination signal, and said nonsteering state signal, and operative to control said motor driving means in accordance with said vehicle velocity signal and said steering torque signal so as to control the torque of said motor, and for supplying a current of a magnitude corresponding to said declination signal to said motor so as to decrease the declination angle of said vehicle wheel while said nonsteering state signal is detected.

11. An electrical power steering apparatus comprising:
vehicle velocity detecting means for detecting vehicle velocity and for generating a corresponding velocity signal;
steering torque detecting means for detecting the steering torque of a steering wheel and for generating a corresponding steering torque signal;
steering direction detecting means for detecting the steering direction of said steering wheel and for generating a corresponding steering direction signal;
motor driving means for driving a power assist motor used to assist in the vehicle steering operation;
means for detecting the declination angle of a vehicle wheel and for generating a corresponding wheel declination signal, and including
a patterned electrode on a board and
a movable element slideable along said electrode, said electrode being provided with a plurality of slits and a plurality of blank portions so as generate a binary signal representing said declination angle;

means for detecting a nonsteering state and for generating a corresponding nonsteering state signal; and
control means responsive to said velocity signal, said steering torque signal, said steering direction signal, said wheel declination signal, and said nonsteering state signal, and operative to control said motor driving means in accordance with said vehicle velocity signal and said steering torque signal so as to control the torque of said motor, and for supplying a current of a magnitude corresponding to said declination signal to said motor so as to decrease the declination angle of said vehicle wheel while said nonsteering state signal is detected, said control means including
velocity discriminating means for receiving said velocity signal and for generating a corresponding velocity mode signal representing one of a plurality of velocity signals ranging from a relatively high value to a relatively low value;
steering direction discriminating means for receiving said steering direction signal and said nonsteering state signal, and for generating a signal indicating either the right or the left steering direction,
current duty ratio memory means for receiving said velocity mode signal and for generating a corresponding duty ratio current for supply to said motor,
declination discriminating means for receiving said declination signal and for generating a declination discrimination signal representing a current declination, and
motor forward/reverse rotation discriminating means for receiving said declination discrimination signal, said current duty ratio signal, and the steering direction discrimination signal, and for determining the rotational direction of said motor.

* * * * *